United States Patent [19]

Garoni et al.

[11] Patent Number: 5,482,472
[45] Date of Patent: Jan. 9, 1996

[54] ELECTRICAL SIGNAL GENERATOR INTERFACE WITH THREE-DIMENSIONAL ELECTRICAL PATHWAY AND TRANSPARENT HEART AND METHOD OF VISUALLY SIMULATING CARDIAC WAVEFORMS IN THREE DIMENSIONS

[75] Inventors: Charles Garoni, San Antonio; Joseph Peters, La Coste; William Butler, Comfort; Fred J. Dunn, San Antonio, all of Tex.

[73] Assignee: Board of Regents, The University of Texas System, Austin, Tex.

[21] Appl. No.: 153,678

[22] Filed: Nov. 17, 1993

[51] Int. Cl.⁶ ............................................. G09B 23/28
[52] U.S. Cl. ..................... 434/272; 434/262; 434/365; 364/413.01; 128/710; 345/83
[58] Field of Search .................. 434/272, 257, 434/262, 268, 307 R, 365, 370, 413.01; 364/413.02, 413.05, 578; 128/642, 670, 695, 700, 710; 345/82, 83, 44, 46

[56] References Cited

U.S. PATENT DOCUMENTS

| | | | |
|---|---|---|---|
| 2,971,272 | 2/1961 | Barlow | 434/272 |
| 3,178,833 | 4/1965 | Gulbransen, Jr. et al. | 434/272 |
| 3,323,068 | 5/1967 | Words . | |
| 3,469,115 | 9/1969 | Partridge . | |
| 3,552,036 | 1/1971 | Mahler | 434/262 |
| 4,204,261 | 5/1980 | Ruszala et al. . | |
| 4,205,386 | 5/1980 | Ruszala et al. . | |
| 4,352,163 | 9/1982 | Schultz, Jr. et al. . | |
| 4,561,851 | 12/1985 | Ferreira et al. . | |
| 4,639,223 | 1/1987 | Keller, Jr. | 434/272 |
| 4,870,325 | 9/1989 | Kagar | 345/83 X |
| 4,898,181 | 2/1990 | Kessler . | |
| 4,907,973 | 3/1990 | Hon | 434/272 X |
| 5,041,973 | 8/1991 | Lebron et al. . | |

FOREIGN PATENT DOCUMENTS

| | | | |
|---|---|---|---|
| 3834553 | 4/1999 | Germany | 434/272 |
| 2-215439 | 8/1990 | Japan . | |
| 2-218341 | 8/1990 | Japan . | |
| 2-218342 | 8/1990 | Japan . | |
| 2-218340 | 8/1990 | Japan . | |
| 9317409 | 9/1993 | WIPO | 434/272 |

*Primary Examiner*—Joe H. Cheng
*Attorney, Agent, or Firm*—Arnold, White & Durkee

[57] ABSTRACT

A three-dimensional apparatus is disclosed that provides a view of the electrical pathway of the heart as it pertains to a corresponding electrocardiogram tracing on an external heart monitoring device. Also provided is a method of simulating propagation of electrical signals in the heart. The heart model interfaces with an arrhythmia generator or electrocardial simulator. The signals generated by the simulator are indicated visually within the heart model through light emitters (such as light emitting diodes, or other light sources) located in such a fashion as to correspond to the electrical pathways found in a living heart. An external monitor, such as an oscilloscope trace unit, also interfaces with the simulator to simultaneously show the electrocardiogram trace that corresponds to the light display in the heart model.

18 Claims, 9 Drawing Sheets

ELECTRICAL SIGNAL GENERATOR INTERFACE WITH THREE-DIMENSIONAL ELECTRICAL PATHWAY AND TRANSPARENT HEART AND METHOD OF VISUALLY SIMULATING CARDIAC WAVEFORMS IN THREE DIMENSIONS

BACKGROUND OF THE INVENTION

The present invention relates to a device for electrical signal generating systems, and particularly to a device and method for visually modelling cardiac waveforms for demonstration or teaching purposes.

Although normal contraction of the heart is commonly referred to as a "heartbeat," in actuality each such "beat" is a muscular wave that travels across the surface of the heart. It should further be understood that there are two components to a "heartbeat," one being electrical, the other muscular. A typical heart contraction normally originates from an area in the upper right atrium (the sinus auricular node) and spreads in the form of a depolarization wave through the atrioventricular node across the heart to the ventricular myocardium. This depolarization wave then spreads through the muscular tissue of the ventricle to cause the ventricle to contract for pumping blood through the arteries. Electrical activity inherent to the individual myocardial cells initiates and sustains the depolarization wave.

In the event that various cells within the heart have been damaged, propagation of the depolarization wave across the heart may be obstructed. Furthermore, in the event that the cells in a specific region of the heart have been damaged, conflicting depolarization-waves may be generated by the affected cells, which interfere with the normal heart rhythm. A condition known as cardiac arrhythmia or dysrhythmia results.

Medical treatment of cardiac irregularities may be facilitated by an understanding of the mechanisms of cardiac electrical impulses. Such an understanding may be gained through a precise description of the structure and function of the cardiac tissues and electrical pathways. To this end, advances in medical technology have resulted in development of various devices for simulating various electrophysiological impulses. For example, U.S. Pat. No. 3,323,068 to Woods purports to teach an electrocardiogram (EKG) simulator for generating EKG waveforms of the human heart. Similarly, U.S. Pat. No. 3,469,115 to Cartridge purports to teach a cardiac waveform simulator for generating a pulse having a generally triangular shape and a rise time to fall time characteristic closely resembling the pulses of a human cardiac waveform. Both of these references relate to systems for generating analog signals representative of electrophysiological activity in a single dimension with respect to time.

More information on the general state of the art in cardiac mapping systems may be had by reference to Lebron et al., U.S. Pat. No. 5,041,973, the disclosure of which is herein incorporated by reference. The Lebron et al. reference purports to disclose a cardiac mapping system simulator for simulating a series of signals which represent two-dimensional (2D) electrophysiological (EP) impulses. Microprocessor circuitry is included for generating a 2D pattern of timed simulated EP impulses for application to an EP impulse display device, which comprises programmable circuitry for generating a succession of digital signals, and a circuit for receiving the digital signals and, in response, generating output signals on predetermined outputs thereof. The simulated pulses may be used to assess the proper functioning of cardiac mapping systems prior to their use on patients.

For demonstration or teaching purposes, it would be useful to directly and visually correlate a cardiac signal of known parameters with an EKG reading. None of the foregoing references teach a method or apparatus for visually displaying electrical impulses within a physical heart model and correlating those impulses to an EKG tracing on an external monitor. Thus, a need exists for apparatus that may generate heart waveforms and three-dimensionally model the resulting signals in the electrical pathways of a heart while simultaneously producing EKG tracings.

SUMMARY OF THE INVENTION

The device and method of the present invention provide an educational tool to give the observer (such as a student, patient, physician, etc.) an actual three-dimensional view of the electrical pathways of a heart as it pertains to a corresponding EKG tracing. For example, the device may be used by a physician to educate a patient about the particular cardiac dysfunction that the patient may possess. Simultaneous visual comparison of the EKG wave and the electrical wave propagation of the signals in the heart model will facilitate a greater understanding of normal and abnormal heart rhythms. Although cardial activity comprises both electrical and muscular components, the device of the present invention is concerned primarily with the electrical activity within the heart, and not with the actual muscular contraction.

The apparatus of the present invention essentially comprises a heart signal generator, or simulator, that is coupled both to a three-dimensional heart model and to an external heart monitor, such as an oscilloscope. The heart simulator generates preprogrammed digitized cardiac waveforms. The device may also be connected to external cardiac waveform generators, such as a Laerdal Heartsim 2000.

The heart model is preferably constructed of a transparent material (such as plastic, clear resin, acrylic, glass, etc.), and comprises a plurality of electrical pathways corresponding to actual electrical pathways in a heart (for example, a human heart). The electrical pathways are denoted by a plurality of light-emitting devices (such as light-emitting diodes, fiber optic wires, miniature light bulbs, etc.) that may be of varying sizes and colors for denoting the various pathways. For ease of viewing by an audience, the heart model is preferably several times the size of an actual heart.

In the preferred method of operation according to the present invention, the heart model receives an electrical heart signal of known parameters from the heart simulator electrical signal generator or an external electrical signal generator. The light emitters in the model are caused to flash in a fashion that mimics the electrical wave propagation through an actual heart. The light emitters contained within the heart model are preferably mounted in a fixed pattern so they can be activated in the proper sequence to indicate the bioelectric potential flow within the heart at a given time within the generated waveforms. The pattern of electrical propagation displayed by the heart model will vary according to the rhythm selected from the simulator or electrical signal generator.

The waveforms generated by the simulator are available for monitoring with cardiac monitors as well as any slow sweep, high persistence phosphor oscilloscope. In a preferred embodiment according to the present invention, the simulator interfaces with an external monitoring device, such as a sweep oscilloscope or heart monitor. Exemplary monitoring devices include the Tektronix sweep oscilloscope and the PhysioControl Lisepak 10 heart monitor. The external monitoring device displays an EKG trace that corresponds to the light display in the heart model, with the display synchronized by the simulator. Visual comparison of the EKG wave and the electrical wave propagation in heart model, as indicated by the flashing light emitters, may then be studied and compared.

The advantages of the present invention will be further appreciated from the drawings and from the detailed description provided below.

BRIEF DESCRIPTION OF THE DRAWINGS

The herein described advantages and features of the present invention, as well as others which will become apparent, are attained and can be understood in more detail by reference to the following description and appended drawings, which form a part of this specification.

It is to be noted, however, that the appended drawings illustrate only exemplary embodiments of the invention and are therefore not to be considered limiting of its scope, for the invention may admit to other equally effective embodiments.

DETAILED DESCRIPTION OF THE PREFERRED EMBODIMENTS

Figure 1:
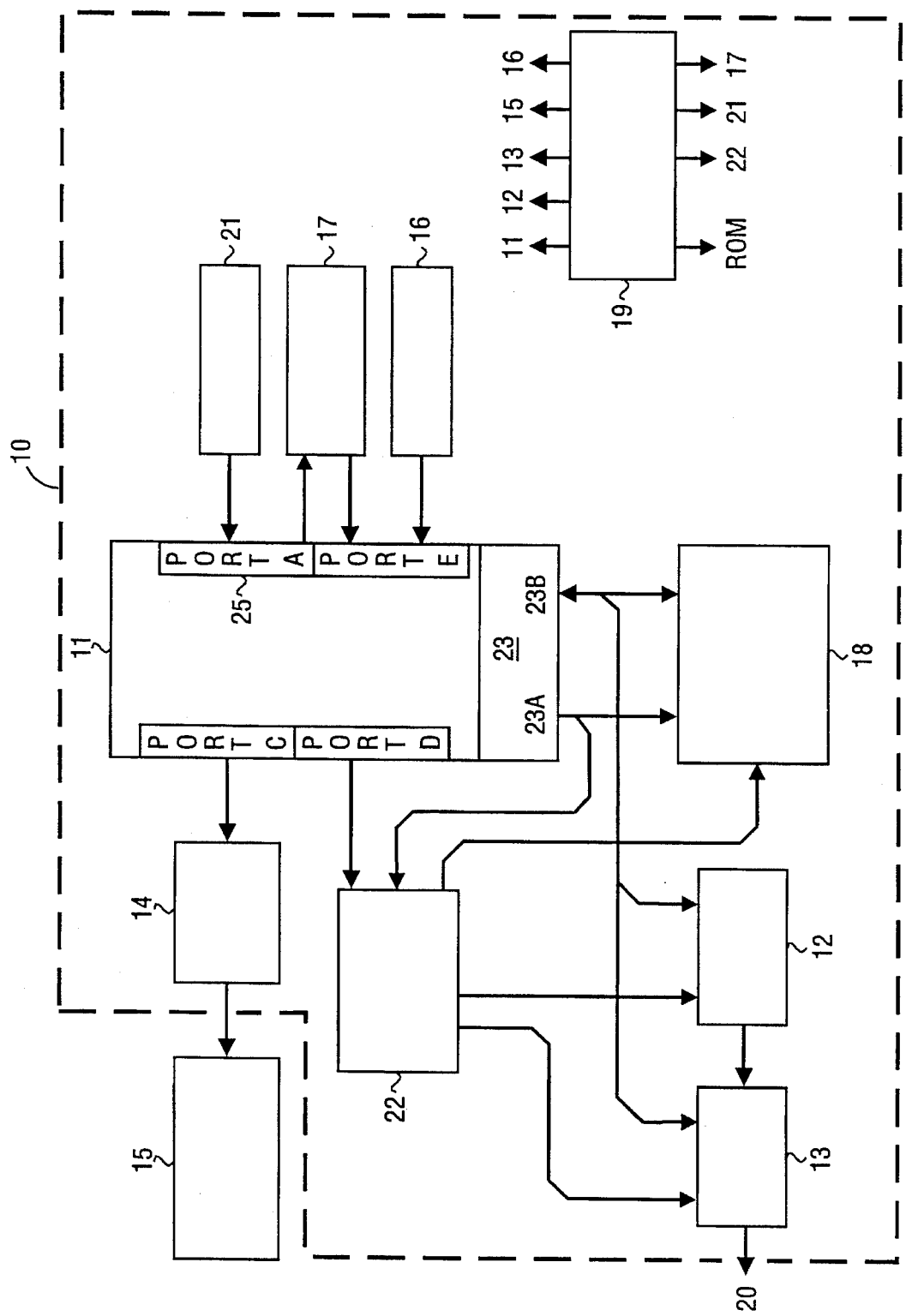
FIG. 1 is a block diagram of a heart simulator system according to the present invention.
Figure 2A:
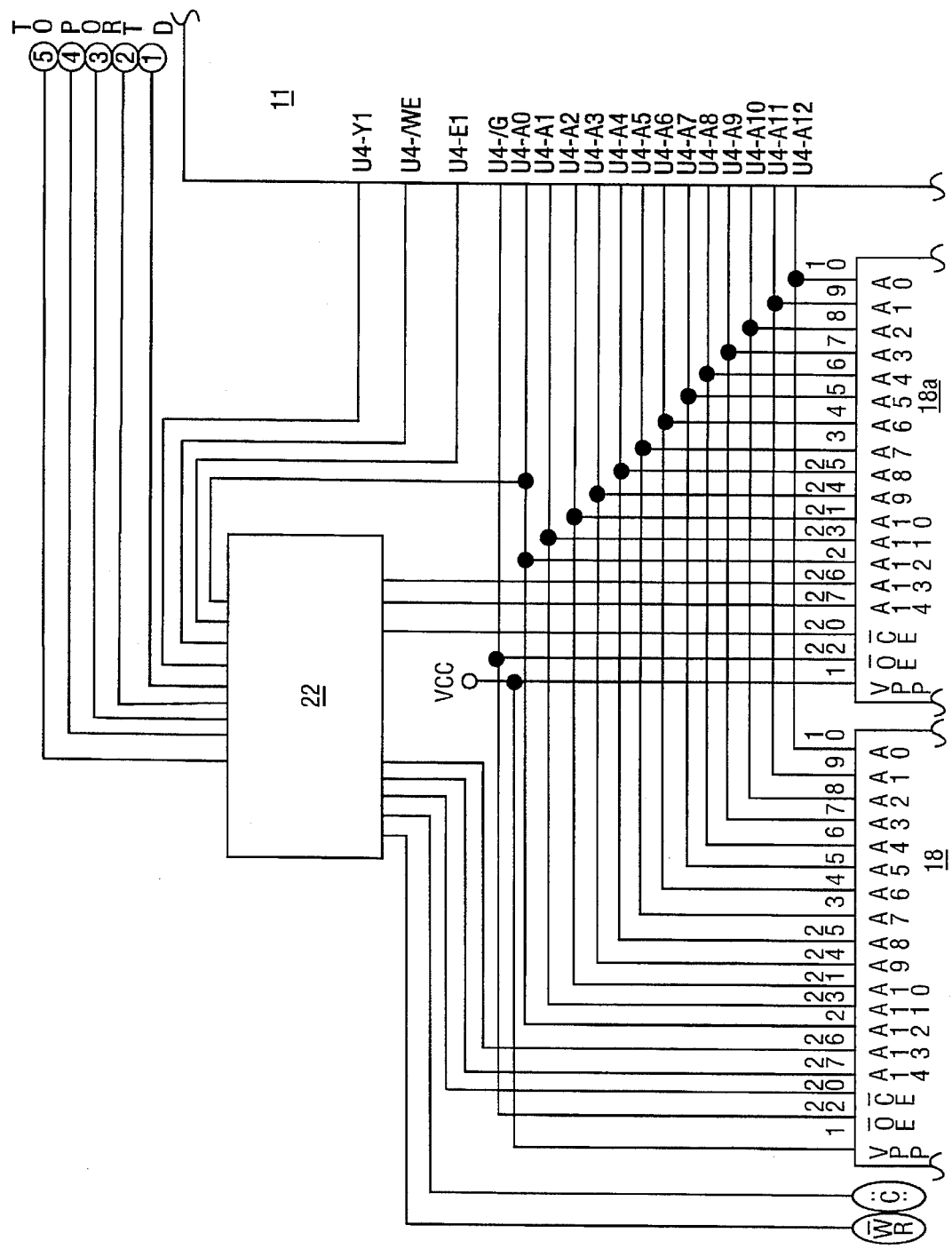
FIGS. 2A–2D, combined, are a partial schematic of a heart simulator system according to the present invention.
Figure 2B:
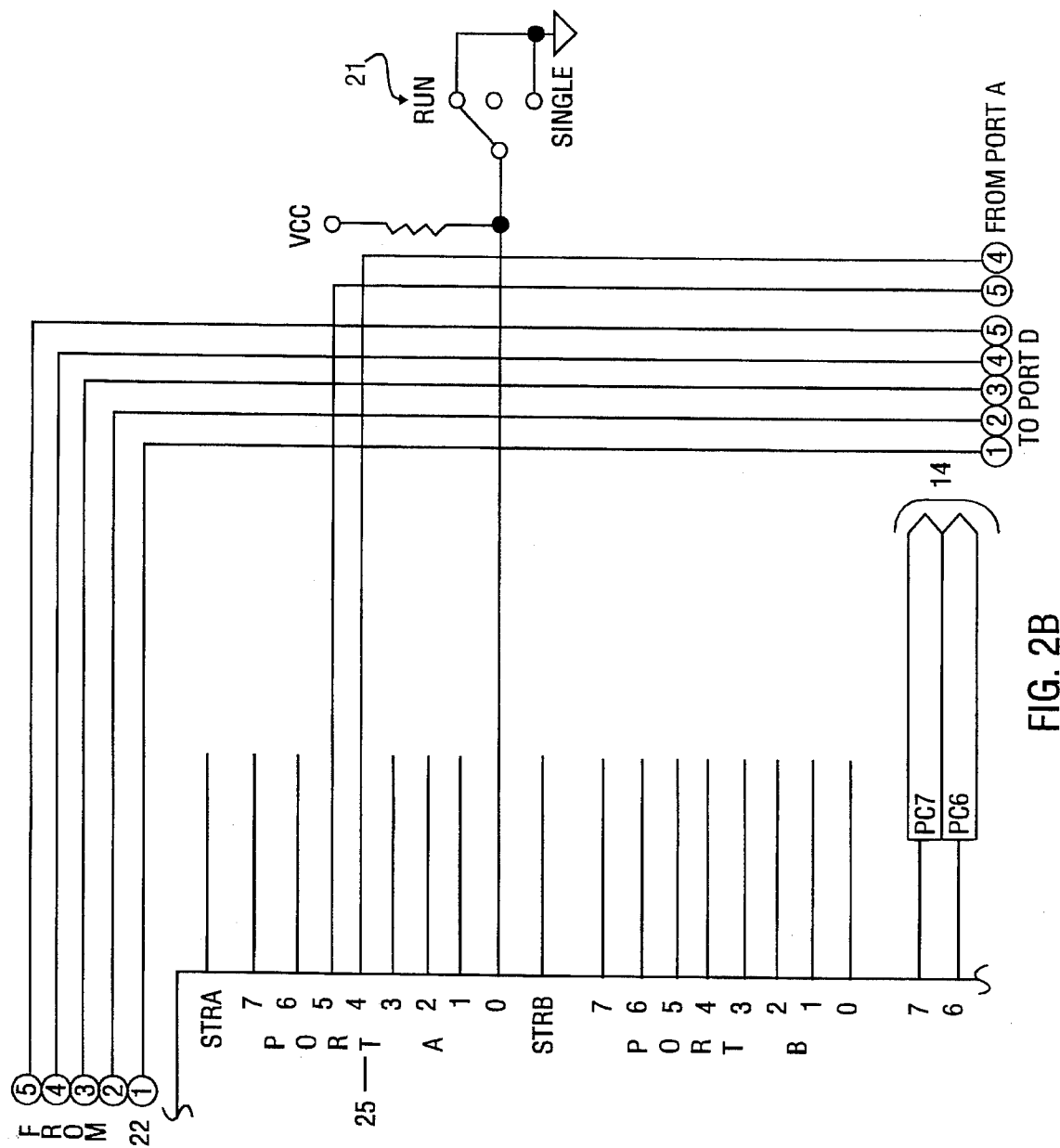
Figure 2C:
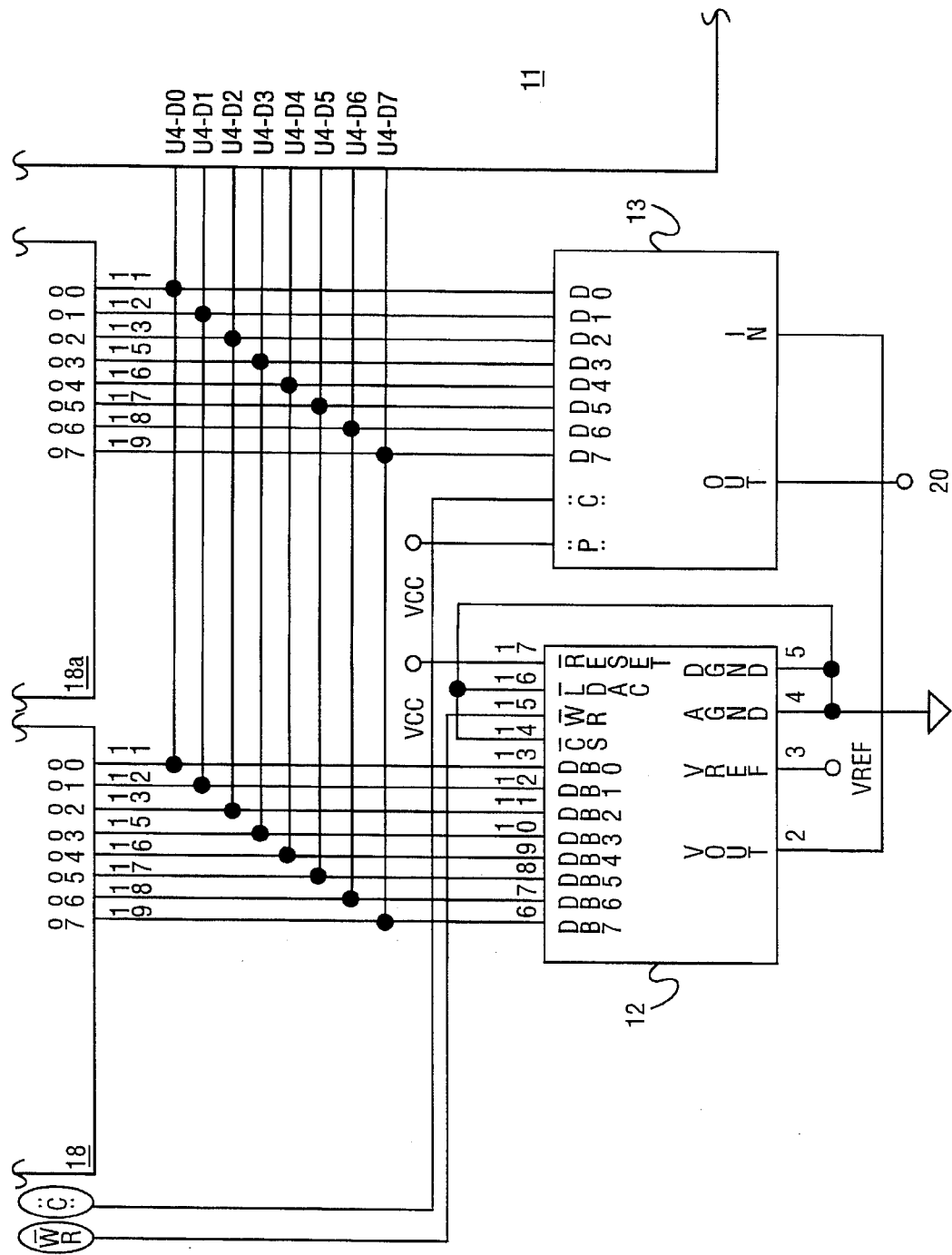
Figure 2D:
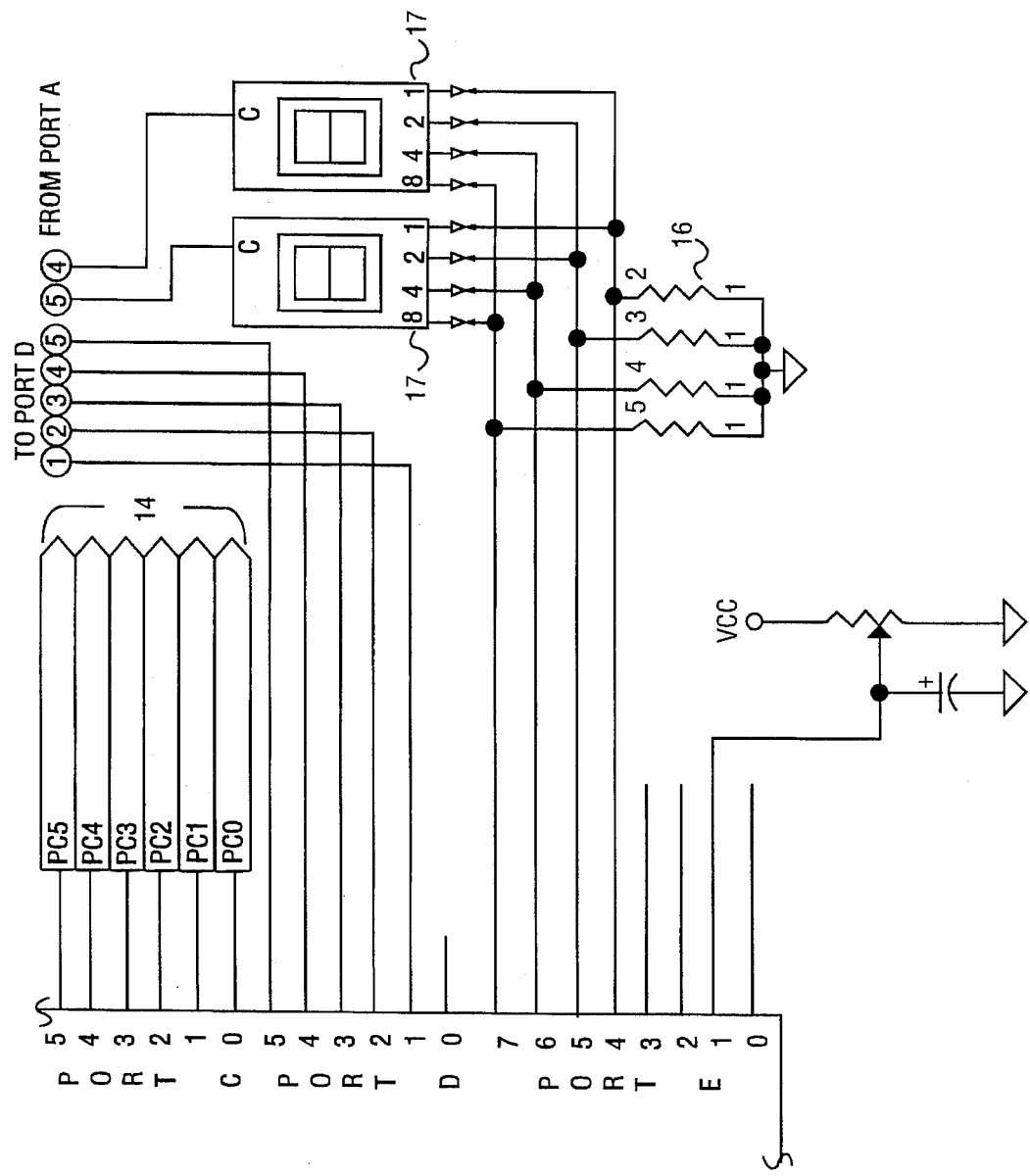

Turning now to the drawings, FIG. 1 is a block diagram of a heart simulator system according to the present invention. FIGS. 2A–2D show a more detailed partial schematic for the heart simulator of FIG. 1. Simulator 10 generates digitized electrocardial waveforms, and is electrically coupled to both the light emitter array 15 in the model heart (FIG. 3) as well as to an external cardiac monitor, such as oscilloscope 20.

As shown in FIG. 1 and FIGS. 2A–2D, the core of simulator 10 is controller board 11, which may comprise, for example, a Motorola MC68HC11 microcontroller operating at 4 MHz and residing on a Motorola MC68HC11EVB evaluation board that operates the microcontroller in its expanded mode of operation with a connector that makes available all single-chip mode signals. Controller 11 preferably contains read-only memory (ROM), random access memory (RAM), digital input/output ports 25, a 16-bit timer subsystem, and an 8-bit analog-to-digital (A/D) converter.

External to controller 11 is an 8-bit digital-to-analog converter (DAC) 12, which is used to convert an 8-bit binary code into an analog level proportional to the binary weight of the code issued. In a preferred embodiment, the generated waveform is generated by presenting new binary data to converter 12 at a rate of 1000 times per second (1 ms digitizing). Thus, for a 4 second waveform, 4000 bytes of data are required.

DAC 12 is coupled to 8-bit programmable low-pass filter 13, which is used to pass the desired waveform frequencies while removing digitizing (sampling) frequencies from the waveform output. A suitable corner frequency is approximately one-half the digitizing frequency. A suitable frequency range of filter 13 is 10 Hz to 2560 Hz in 10 Hz steps. Filter 13 is connected to the data bus 23B from expanded bus 23 of controller 11. Changing the corner frequency of filter 13 may be accomplished by writing a new data value to address 2001H or any odd address between 2000H–3FFFH. The corner frequency follows the following equation:

$$F_c = 10 Hz(1 + D7*2^7 + D6*2^6 + D5*2^5 + D4*2^4 + D3*2^3 + D2*2^2 + D1*2^1 + D0*2^0) \tag{1}$$

where D0–D7=logic 0 or 1
Fc=corner frequency.

The analog input to filter 13 comes directly from DAC 12. The output of filter 13 preferably goes through a resistive voltage divider (not shown), which scales the voltage down by a factor as necessary to match the input of the external monitoring device. For example, cardiac monitors typically accept inputs in the range of 10–100 mV; scaling down the output of filter 13 is thus required, as the filter output will be on the order of 5 V for the digital circuit of FIGS. 1–2.

Potentiometer 16 is coupled to the analog-to-digital converter within controller 11, and is used to vary the rate at which simulator be digitizes the waveform and light signals. The clockwise contact of potentiometer 16 is connected to the same voltage reference source as controller 11. As potentiometer 16 is changed, the output of the analog-to-digital converter changes accordingly, presenting to the internal bus within controller 11 an 8-bit value whose binary value is directly proportional to the position of the potentiometer.

Expanded bus 23 of controller 11 also comprises address bus 23A, coupled to ROM 18 and programmable logic device 22. Programmable logic device 11 is used to generate control signals and high address signals (address lines beyond the block size) for the external data ROM 18a and control signals for DAC 12 and programmable low-pass filter 13. Two 32k×8 bit (256 kbyte) electrically programmable read-only-memory (ROM) devices 18, 18a FIGS. 2A–2D are also coupled to controller 11. Five lines from Port D of controller 11 are input to logic device 22, which converts the inputs to 8K memory block select signals within ROM devices 18, 18a. Using five lines from controller, $2^5$ (or 32) combinations are available, allowing the logic device 22 to address 32×8 kbytes, or 256 kbytes of ROM.

As shown in FIGS. 2A–2D, two separate blocks of ROM 18 are available to controller 11. A first block 18 contains the actual program and subroutines that run simulator 10 and a second block 18a is a much larger block of memory for the waveform and light data. The combined amount of ROM 18 available to controller 11 is preferably larger than the addressing range of controller 11 to facilitate the amount of data memory required.

Page addressing within controller 11 may be used so that thumbwheel switches 17 serve to enable a particular block of memory (for example, 8K or 8192 bytes) and to cause the controller's address bus to select the desired data within the data block. One suitable form of page addressing may use a parallel output port from controller 11 as the page select lines and be further decoded by programmable logic device 22 to generate all required high address lines and control signals for ROM devices 18, 18a. Selection of the appropriate page in ROM 18a may be accomplished by connecting two BCD switches 17 to controller 11 and reading the values of these switches, and through the software determine the correct data memory page number and validity of the page number selected. Address lines of controller 11 will then select the data within this page directly.

Thumbwheel switches 17 are preferably BCD coded, and are used to select the waveform desired. By changing the position of switches 17, the user changes the block of ROM from which the controller reads the waveform and light data, and thus changes the particular waveform generated and displayed.

Figure 3:
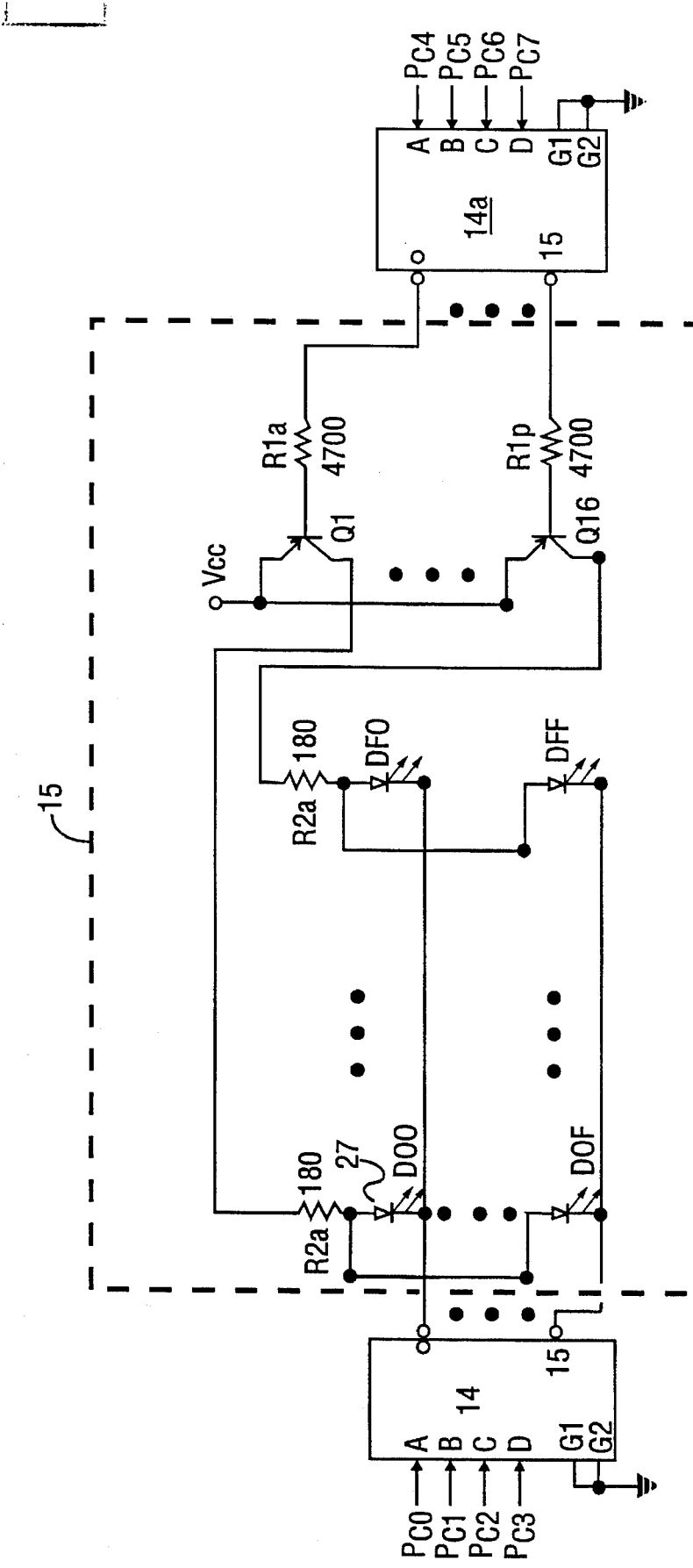
FIG. 3 is a partial schematic of a light-emitter array for a heart simulator system according to the present invention.

Controller 11 is also coupled to decoder/driver circuit, which comprises two 4-line to 16-line decoders 14 and 14a. Decoders 14 and 14a are used to activate particular light emitters 27 contained within the light emitter array 15, as shown in FIG. 3. For a 16×16 array (a portion of which is shown in FIG. 3), the activation of LED's 27 within the array 15 is controlled by an assembly comprising decoders 14, 14a, 16 small signal transistors Q1–Q16, 16 180 ohm ¼ watt resistors R1a–R1p, and 16 4700 ohm ¼ watt resistors R2a–R2p. A 16×16 matrix is formed by the outputs of the decoders and at each of these intersections is an LED D00–DFF (27). For the embodiment shown in FIG. 3, the activation of a particular LED 27 requires that the two lines connected to the LED 27 (1 from each decoder/driver 14 and 14a) be activated simultaneously.

The outputs of decoder circuit 14 are input to matrix 15 without any further buffering or inversion, and comprise the sinking lines of the matrix. The single output of decoder 14 that is active at a given moment is used for sinking current on that line of the matrix. Outputs from each line of decoder 14a are buffered and inverted using a PNP transistor Q1–Q16 as the switching/inverting element in an open collector configuration, using, for example a 4700 ohm base drive resistor, such as R1a shown between the output of decoder 14a and transistor Q1. The buffered/inverted outputs from decoder 14a form the sourcing lines of matrix 15.

Because only one output from each decoder 14 and 14a can be active at a time, the result is that one sourcing line becomes active and one sinking line becomes active. In turn, the LED at that particular intersection becomes activated. Only 1 LED in the array of 256 is active at any given moment. For example, if output 15 from decoder 14 is active and output 0 from decoder 14a is active, LED D0F shown in the exemplary configuration of FIG. 3 will be illuminated.

The 180 ohm resistors R2a–R2p are used in series with each of the source lines at the outputs of each of the output transistors to limit the current to each LED to less than 20 milliamps, based on the forward current limitations of the chosen LEDs (see Table I). Other configurations of the current limiting resistors and LEDs will be apparent to those of skill in the art.

Power supply and reference circuit 19 provides the necessary power for simulator 10. The reference circuit within power supply 19 provides the necessary reference values for analog-to-digital converter within controller 11 and also for digital-to-analog converter 12. Preferred specifications of power supply 19 are +12 volts at 0.5 amps, −12 volts at 0.5 amps, and +5 volts at 3 amps. (All voltage specs are +/−5%.)

The Table below lists component values for the electronic components of FIGS. 1–3.

TABLE I

| | |
|---|---|
| Digital-to-Analog converter 12 | Maxim Semiconductor AD7224KN |
| Low-pass filter 13 | Frequency Devices 848P8B-3 |
| 4-bit to 16-bit decoder 14 | Harris Semiconductor CD74HCT154E |
| Potentiometer 16 | Bourns 73JA10K |
| Thumbwheel switches 17 | Cherry T50-02M |
| Programmable ROM 18 | Texas Instruments TMS27C256 |
| Programmable logic device 22 | Lattice Semiconductor GAL16V8 |
| PNP transistors Q1-16 | Sylvania ECG159 |
| Light emitters 27 | Panasonic LN29RPP (red) |

It is to be understood that certain of the component values given in Table I may be different for a given implementation of the present invention, and the values in Table I are provided only for the purposes of describing a presently preferred or exemplary implementation of the invention. For example, although a red LED is given as exemplary of light emitter 27, multiple colors of light emitters are preferred, as described below.

Figure 4:
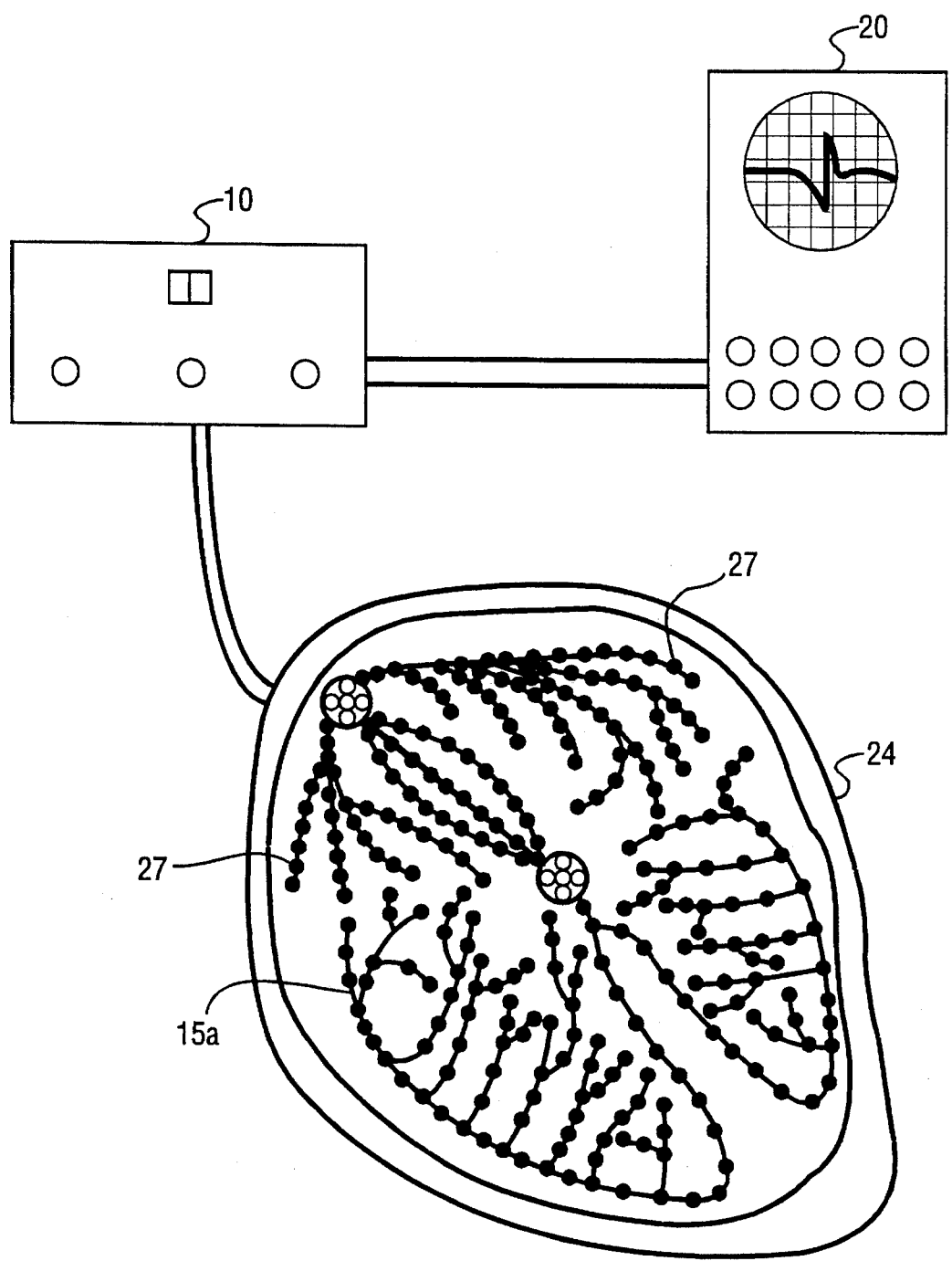
FIG. 4 depicts electrical pathways of an embodiment of heart simulator apparatus according to the present invention.
Figure 5:
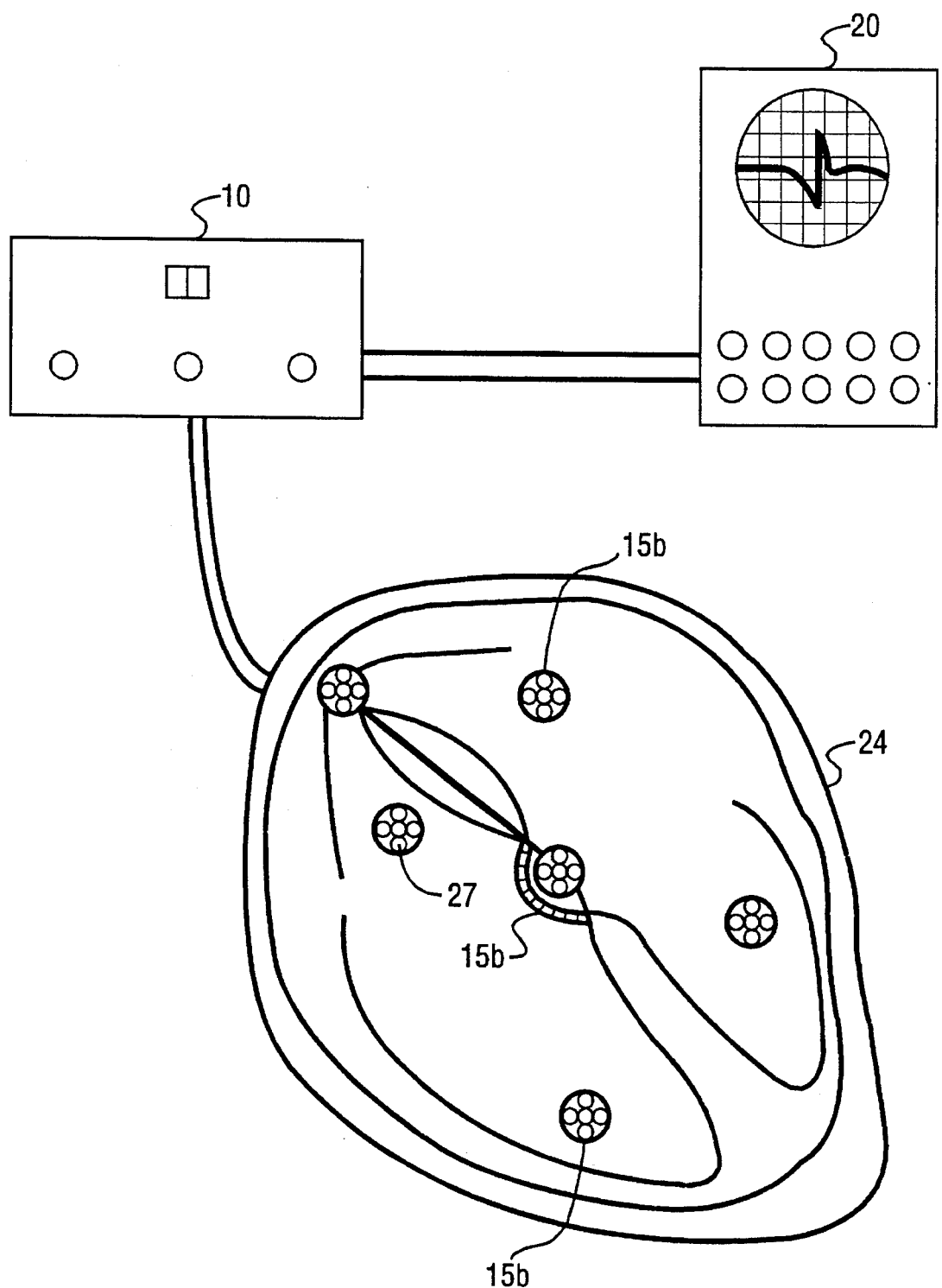
FIG. 5 depicts electrical pathways for atrial tachycardia, ventricular tachycardia, and Wolfe-Parkinson-White Syndrome as displayed in apparatus according to the present invention.
Figure 6:
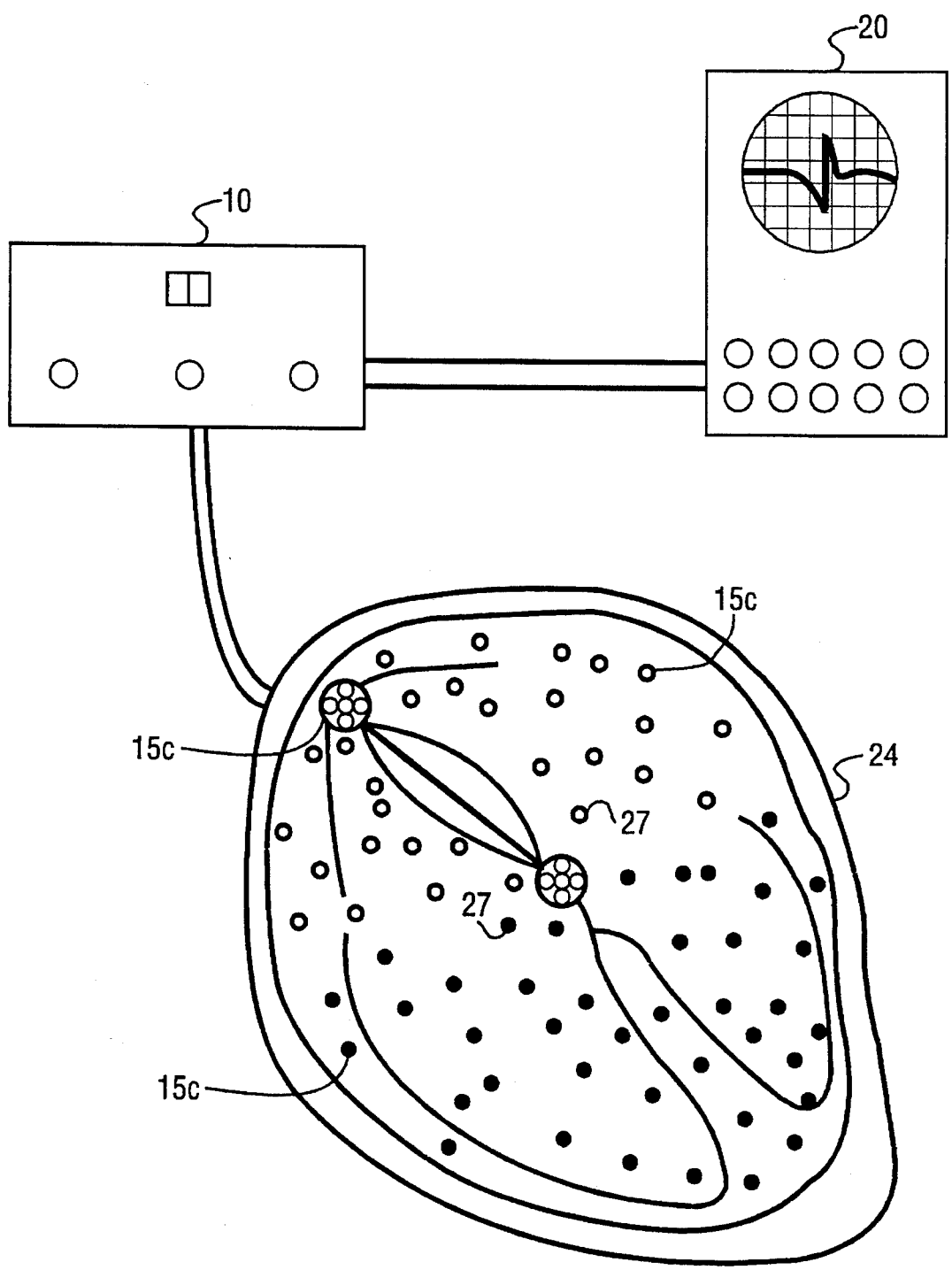
FIG. 6 depicts electrical pathways for atrial and ventricular fibrillation as displayed in apparatus according to the present invention.

Light emitter array 15 is contained within heart model 24, as shown in various configurations in FIGS. 4–6. Individual light emitters 27 within array 15 are arranged in a fixed pattern, and their activation indicates electrical activity occurring at that physical location at that particular point within the output waveform. It is preferred that light emitters 27 be of various colors so that individual cardiac pathways may be distinguished visually.

For demonstration or teaching purposes, light emitter array 15 may be used to illustrate different electrocardial phenomena, as depicted in FIGS. 4–6. FIG. 4 shows light emitter array 15a in heart model 24 displaying normal conduction through the Sino-Atrial (SA) node, internodal and interatrial pathways, Atrio-Ventricular (AV) node, Bundle of His left and right bundle branches, and the Purkinjie fibers. As will be apparent to one of skill in the art, the light emitter array 15a is capable of demonstrating all sinus rhythms, blocks (AV and bundle branch), junctional rhythms, ventricular rhythms, sinus block, sinus arrest, sinus Tachycardias, sinus Bradycardias, accelerated rates, atrial flutter, ventricular standstill, and agonals.

FIG. 5 similarly shows light emitter array 15b in heart model 24 displaying show Bachman's bundle (conduction by-passing the AV node, as in Wolfe-Parkinson-White Syndrome). The light emitter array structure 15b would be capable of demonstrating the effects of a single irritable focus and multiple irritable foci on ventricular and atrial rates (Atrial Tachycardia, Ventricular Tachycardia, Torsades De Pointes), wandering pacemaker, Premature Atrial Contraction, Premature Junctional Contraction, and Premature Ventricular Contraction.

FIG. 6 shows light emitter array 15c in heart model 24, wherein the configuration of the array allows demonstration of atrial and ventricular fibrillation.

In all of the foregoing embodiments of light emitter array 15, each electrical path structure would preferably be composed of a different colored light emitters, which would glow in sequence to represent the conduction through that structure.

In a preferred method of operation according to the present invention, simulator 10 is powered on, and a desired waveform is selected by appropriately setting thumbwheel switches 17. Run switch 21 is then placed in either the run position, or is momentarily placed in the cycle position to choose between continuous output or single cycle (i.e., one complete read of waveform ROM 18 and then stop) respectively. This feature allows the waveform to be generated and displayed in a single or continuous cycle. Single-cycle mode is useful for distinguishing the beginning of a full cycle from the end of the cycle. Controller 11 will initiate the routine for generating the desired waveform. Waveform signals from controller 11 will simultaneously pass to DAC 12 and through low-pass filter 13 for driving external oscilloscope 20, as well as to decoder/drivers 14 for driving light emitter array 15. By comparing the visual display on oscilloscope 20 with the light emitter signals within heart model 24, the observer will be able to correlate EKG-type tracings with the electrical signals traversing through the pathways of a heart.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. Apparatus for simulating electrical impulses in a heart, comprising:

an electrocardial signal generator for generating simulated electrocardial waveforms;

at least one three-dimensional electrical pathway corresponding to an actual electrocardial pathway within a living heart, said three-dimensional pathway coupled to said electrocardial signal generator; and a plurality of three-dimensional light emitters placed along said three-dimensional pathway to visually indicate said simulated electrocardial waveforms along said three-dimensional pathway.

2. The apparatus according to claim 1, wherein said light emitters are light-emitting diodes.

3. The apparatus according to claim 1, further comprising a three-dimensional transparent shell physically resembling the external appearance of a human heart, said shell encasing said three-dimensional pathway and said three-dimensional light emitters.

4. The apparatus according to claim 3, wherein said transparent shell is comprised of clear plastic.

5. The apparatus according to claim 1, further comprising an external cardiac monitoring device coupled to said electrocardial signal generator.

6. The apparatus according to claim 5, wherein said external cardiac monitoring device comprises a sweep oscilloscope.

7. The apparatus according to claim 1, wherein said simulated electrocardial waveforms are of a known pattern.

8. Apparatus for simulating electrical impulses in a heart, comprising:

an electrocardial simulator for generating simulated electrocardial waveforms of a known pattern;

a plurality of three-dimensional electrical pathways corresponding to actual electrocardial pathways within a living heart, said three-dimensional pathways coupled to said electrocardial simulator;

a plurality of three-dimensional light emitting devices placed along each of said three-dimensional pathways to visually indicate said simulated electrocardial waveforms along said three-dimensional pathways;

an external cardiac monitoring device coupled to said electrocardial simulator; and a three-dimensional transparent shell physically resembling the external appearance of a human heart, said shell encasing said three-dimensional pathways and said three-dimensional light emitting devices.

9. The apparatus according to claim 8, wherein light three-dimensional emitting devices comprise light emitting diodes.

10. The apparatus according to claim 9, wherein different said three-dimensional pathways are characterized by differently-colored light-emitting diodes.

11. The apparatus according to claim 8, wherein said electrocardial simulator comprises:

a controller coupled to external memory, wherein said memory stores preselected waveform data for illuminating particular sequences of light emitters in a known pattern;

switching means coupled to said controller for selecting particular portions of said memory, each said portion representing a different known pattern;

address decoding means for accessing said selected memory portion; and decoder means for activating particular three-dimensional light emitting devices in said known pattern indicated by data stored in said selected external memory portion.

12. The apparatus according to claim 8, wherein said external cardiac monitoring device comprises a sweep oscilloscope.

13. A method of visually simulating electrical impulses in a heart, comprising:

providing an electrocardial signal generator;

selecting an electrocardial signal;

providing at least one three-dimensional pathway corresponding to an actual electrocardial pathway within a living heart;

denoting the contours of said three-dimensional pathway by a plurality of three-dimensional light emitters, said three-dimensional light emitters being responsive to said electrocardial signal; and transmitting said electrocardial signal to said pathway, thereby causing said three-dimensional light emitters to illuminate in simulation of movement of an actual electrocardial signal in a living heart.

14. The method of claim 13, further comprising providing a trace oscilloscope coupled to said electrocardial signal generator.

15. The method of claim 13, further comprising providing a plurality of said three-dimensional pathways, wherein each said three-dimensional pathway corresponds to a different electrical pathway in a living heart.

16. The method of claim 15, further comprising denoting each of said three-dimensional pathways by differently colored three-dimensional light emitters.

17. The method according to claim 13, wherein said selecting step comprises selecting an electrocardial signal of a known pattern.

18. The method according to claim 13, further comprising the step of displaying said electrocardial signal on an external cardiac monitoring device simultaneously with said transmitting step.

* * * * *